United States Patent
Lange et al.

(10) Patent No.: US 9,953,450 B2
(45) Date of Patent: Apr. 24, 2018

(54) GENERATION OF ANIMATION USING ICONS IN TEXT

(75) Inventors: Hervé Lange, Montreal (CA); Frédéric Brunel, Montreal (CA); Benoit Peltier, Pointe-Aux-Trembles (CA)

(73) Assignee: NAWMAL, LTD, Guildford (GB)

( * ) Notice: Subject to any disclaimer, the term of this patent is extended or adjusted under 35 U.S.C. 154(b) by 1046 days.

(21) Appl. No.: 12/482,784

(22) Filed: Jun. 11, 2009

(65) Prior Publication Data

US 2010/0122193 A1    May 13, 2010

Related U.S. Application Data

(60) Provisional application No. 61/060,528, filed on Jun. 11, 2008.

(51) Int. Cl.
| | | |
|---|---|---|
| *G06F 3/048* | (2013.01) | |
| *G06T 13/00* | (2011.01) | |
| *G11B 27/034* | (2006.01) | |
| *G11B 27/34* | (2006.01) | |
| *G09B 17/00* | (2006.01) | |
| *G06F 3/0481* | (2013.01) | |
| *G06T 13/20* | (2011.01) | |
| *G09B 5/06* | (2006.01) | |
| *G09B 17/02* | (2006.01) | |
| *G06T 13/40* | (2011.01) | |
| *G10L 21/10* | (2013.01) | |

(52) U.S. Cl.
CPC ............ *G06T 13/00* (2013.01); *G11B 27/034* (2013.01); *G11B 27/34* (2013.01); *G06F 3/04817* (2013.01); *G06T 13/205* (2013.01); *G06T 13/40* (2013.01); *G09B 5/062* (2013.01); *G09B 5/065* (2013.01); *G09B 17/00* (2013.01); *G09B 17/006* (2013.01); *G09B 17/02* (2013.01); *G10L 2021/105* (2013.01)

(58) Field of Classification Search
CPC ...... G09B 17/00; G09B 17/02; G09B 17/006; G09B 5/062; G09B 5/065; G06T 13/40; G06T 13/205; G10L 2021/105; G06F 3/04817
USPC ......................................... 715/765, 769, 835
See application file for complete search history.

(56) References Cited

U.S. PATENT DOCUMENTS 5,682,206 A * 10/1997 Wehmeyer ....... H04N 21/47214
                                                          348/570
5,689,618 A * 11/1997 Gasper .................. G06T 13/205
                                                          345/473

(Continued)

OTHER PUBLICATIONS

Joey Lott, "Flash 8 Cookbook," O'Reilly Media, Inc., Apr. 12, 2006, sections P2, 4.1, 4.12, 4.14, 10.3, 12, 21-1.*

(Continued)

*Primary Examiner* — Patrick F Riegler
(74) *Attorney, Agent, or Firm* — Fogg & Powers LLC

(57) ABSTRACT

There is described a method for creating an animation, comprising: inserting at least one icon within a text related to the animation, the at least one icon being associated with an action to be performed by one of an entity and a part of an entity, at a point in time corresponding to a position of the at least one icon in the text, and a given feature of an appearance of the at least one icon being associated with one of the entity and the part of the entity; and executing the text and the at least one icon in order to generate the animation.

24 Claims, 19 Drawing Sheets

(56) References Cited

U.S. PATENT DOCUMENTS

| | | | |
|---|---|---|---|
| 5,774,109 A * | 6/1998 | Winksy | G06F 3/0485 345/169 |
| 5,838,906 A * | 11/1998 | Doyle | G06F 9/5027 345/419 |
| 6,022,222 A * | 2/2000 | Guinan | G09B 5/065 345/473 |
| 6,766,299 B1 | 7/2004 | Bellomo et al. | |
| 6,963,839 B1 * | 11/2005 | Ostermann | G10L 13/08 704/2 |
| 7,016,828 B1 | 3/2006 | Coyne et al. | |
| 7,194,699 B2 | 3/2007 | Thomson et al. | |
| 7,315,820 B1 | 1/2008 | Munns | |
| 7,737,980 B2 * | 6/2010 | Le Tuan | G06T 13/80 345/440 |
| 8,073,695 B1 * | 12/2011 | Hendricks | G09B 5/065 379/88.01 |
| 2001/0049596 A1 | 12/2001 | Lavine et al. | |
| 2002/0099552 A1 * | 7/2002 | Rubin | G09F 27/00 704/270 |
| 2004/0114258 A1 * | 6/2004 | Harris, III | G06F 17/24 359/841 |
| 2004/0181413 A1 * | 9/2004 | Lui | G06F 3/16 704/270 |
| 2005/0005308 A1 * | 1/2005 | Logan | G06Q 30/06 725/135 |
| 2005/0069852 A1 * | 3/2005 | Janakiraman | H04M 1/2474 434/236 |
| 2006/0143558 A1 * | 6/2006 | Albornoz | G06F 3/0483 715/205 |
| 2008/0005130 A1 | 1/2008 | Logan et al. | |
| 2008/0027726 A1 * | 1/2008 | Hansen | G10L 13/00 704/260 |
| 2008/0168073 A1 * | 7/2008 | Siegel | G06F 17/3002 |
| 2008/0216022 A1 * | 9/2008 | Lorch | G06F 3/04817 715/847 |
| 2008/0235024 A1 * | 9/2008 | Goldberg | G10L 13/033 704/260 |
| 2009/0132371 A1 * | 5/2009 | Strietzel | G06Q 30/0247 705/14.46 |

OTHER PUBLICATIONS

ContentCreationWiki, "Remote Compiler," Cunningham & Cunningham, Inc., May 23, 2008, http://c2.com/cgi/wiki/wiki/quickDiff?RemoteCompiler.*

John Weissman et al., "Gesture Recognition for Virtual Reality Applications Using Data Gloves and Neural Networks", IEEE, pp. 2043-2046 (1999).

Ralf Salomon et al., "Evolutionary Tuning of Neural Networks for Gesture Recognition", IEEE, pp. 1528-1534 (2000).

Mehdi Rezaei, "Synthetic Video", Tampere University of Technology, Insitute of Signal Processing, Multimedia System Desigen Course Presentation, Mar. 2005 (60 pages).

Stefano Piva et al., "6: A Flexible Architecture for Ambient Intelligence Systems Supporting Adaptive Multimodal Interacation with Users", Ambient Intelligence, IOS Press, pp. 97-120 (2005).

Jodi Forlizzi et al., "The Kinedit System: Affective Messages Using Dynamic Texts", CHI 2003: New Horizons, vol. 5, No. 1, pp. 377-384, Apr. 5-10, 2003.

Koichi Emura et al., "Personal Media Producer: A System for Creating 3 D CG Animation from Mobile Phone E-mail", Journal of Multimedia, vol. 1, No. 2, pp. 30-37, May 2005.

Rob Diaz-Marino et al., "Lyric Text: An Animated Display of Song Lyrics", Lyric Text, Report iLab-2005-1, Grouplab, Dept. Computer Science, University of Calgary, May 2005 (2 pages).

Justine Cassell et al., "BEAT: The Behavior Expression Animation Toolkit", Proceedings of SIGGRAPH '01, pp. 477-486, Aug. 12-17, 2001.

Active Multimedia Digital, Brochure, (2 pages).

* cited by examiner

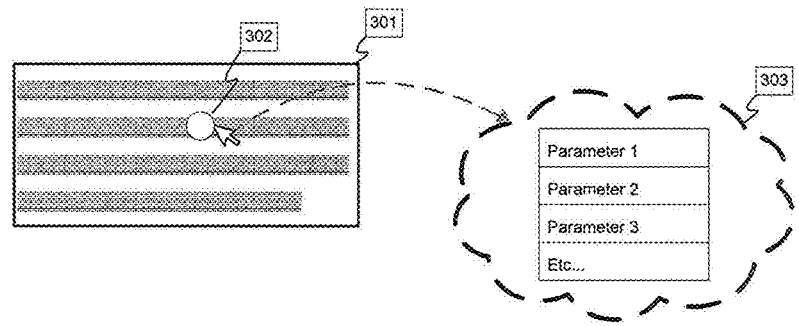
Figure 3A
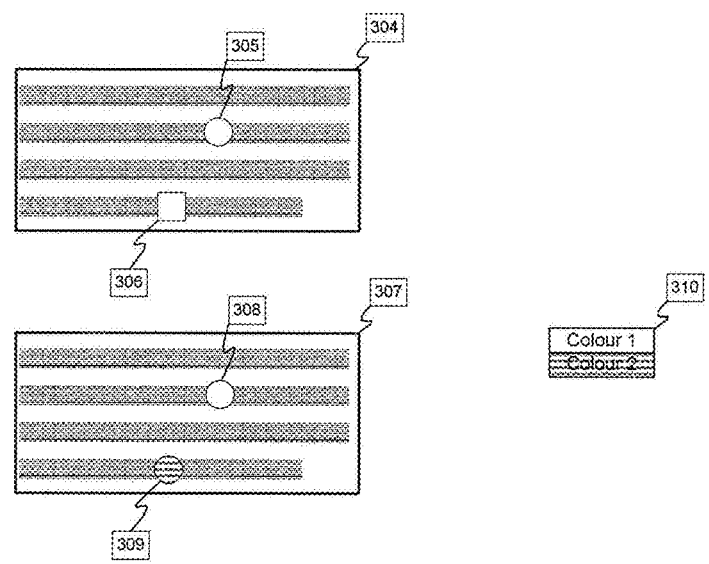
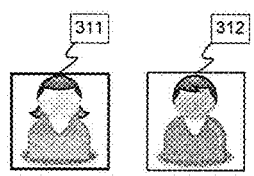
Figure 3B
Figure 3C

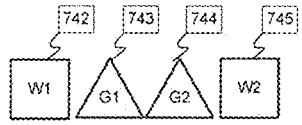

Figure 7E

Examples of synchronization for a single entity (colour):

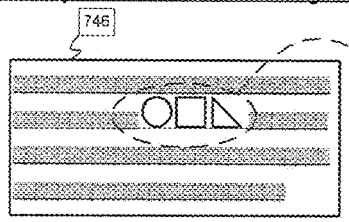

The three actions happen simultaneously on the same entity (Bob) because they are on different channels and there is no separator symbol.

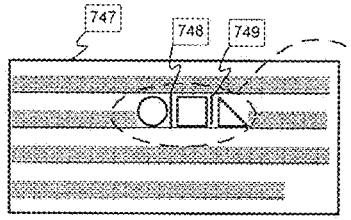

The same three actions happen consecutively when there is a separator symbol.

Examples of synchronization for multiple entities (colours):

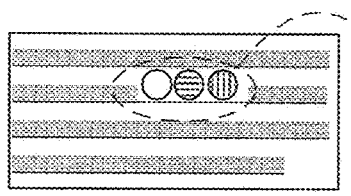

No interference and no separator symbol: therefore execute simultaneously.

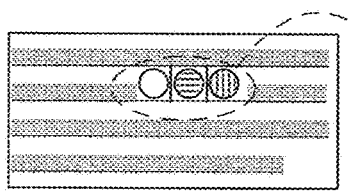

Same situation as above, except all three actions happen consecutively because of the separator symbol.

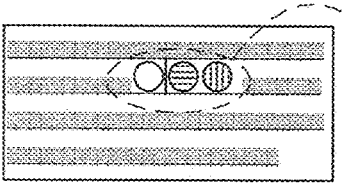

The red and blue actions happen simultaneously, but only after the yellow action has taken place.

Figure 7F

GENERATION OF ANIMATION USING ICONS IN TEXT

CROSS-REFERENCE TO RELATED APPLICATIONS

The present application claims priority under 35USC paragraph 119(e) of U.S. Provisional Patent Application filed on Jun. 11, 2008 and bearing Ser. No. 61/060,528.

TECHNICAL FIELD

The present invention relates to the field of text timeline for digital content creation.

BACKGROUND OF THE INVENTION

When attempting to construct a visualized depiction of a story (or part of a story), it is of importance to control the timing and synchronization of events. When the events that make up the storyline are properly timed and synchronized, they will blend together to convey the vision of the creator to the audience. In current technology, the timing aspect of storytelling is controlled with the aid of a traditional timeline, i.e. a line representing time and containing time markers to allow for the synchronization of events with respect to time. With a traditional timeline the triggering and duration of events within a story can be controlled precisely because each event is tied to a precise moment on the timeline. For example, event 1 might start at time t=1 minute and end at t=4 minutes, while event 2 starts at t=3 minutes and ends at t=5 minutes. The advantage of the traditional timeline is that it controls the timing of events precisely; each event can be precisely positioned within the timeline to exactly control the flow of a story. However, a disadvantage is that all events are linked to an absolute time and so manipulating linked or causal events becomes more difficult. Causal events are events that have a logical order: for example, if you drop a ball you hear the sound of it hitting the ground only after it falls to the ground; you cannot hear the sound before it is dropped. In a traditional timeline the two events, namely the drop of the ball and the sound of it hitting the ground, are tied to specific moments in time on the timeline. If one event is moved, the other one stays locked to its position in time. As a result, the order may not be logical anymore. For example, the sound of the ball hitting the ground may occur before the drop of the ball. One solution to fix this problem is to move both events at the same time. However, when trying to visualize a story, there may be dozens of causal events making it very difficult to keep track of all the causal events and to move them all.

The traditional timeline is also not a natural way to think about synchronizing events within a story. In the mind of most creators, the synchronization is linked to events, not time. For example, a creator thinks of a character waving goodbye ("wave" event) and then exiting a room ("exit" event). The creators do not think in terms of the "wave" event happening at t=3 seconds and the "exit" event happening at t=6 seconds. Using a traditional timeline may not be conducive to creative thinking.

Therefore, there is a need for a more natural timeline adapted to the way of thinking of creators

SUMMARY OF THE INVENTION

The present digital toolset gives the user control over the timing and synchronization of events through the use of enriched text. Text is already a very natural tool for creators and using text to control the timing of a story is a natural extension. A text timeline allows a user to control events primarily with the use of text, so that the synchronization is event driven, and not time driven. When writing, a creator writes in terms of events and not in terms of strict timelines. Furthermore, it is easier to control causal relationships between events using a text timeline.

In accordance with a first broad aspect, there is provided a method for creating an animation, comprising: inserting at least one icon within a text related to the animation, the at least one icon being associated with an action to be performed by one of an entity and a part of an entity, at a point in time corresponding to a position of the at least one icon in the text, and a given feature of an appearance of the at least one icon being associated with one of the entity and the part of the entity; and executing the text and the at least one icon in order to generate the animation.

In accordance with a second broad aspect, there is provided a method for creating an animation, comprising: inserting at least one icon within a text related to the animation, the at least one icon being associated with an action to be performed by one of an entity and a part of an entity, at a point in time corresponding to a position of the at least one icon in the text, and a given feature of an appearance of the at least one icon being associated with the entity; sending animation information to a server, and receiving the animation from the server, the animation being generated in accordance with the animation information.

In accordance with a further broad aspect, there is provided a system for creating an animation, comprising: at least one processor in one of at least one computer and at least one server; and at least one application coupled to the at least one processor, the at least one application being configured for: receiving a text related to the animation, the text comprising at least one icon embedded therein, the at least one icon being associated with an action to be performed by one of an entity and a part of an entity, at a point in time corresponding to a position of the at least one icon in the text, and a given feature of an appearance of the at least one icon being associated with the at least one of an entity and a part of an entity; and executing the text and the at least one icon in order to generate the animation.

The expression "text timeline" refers to an event timeline driven by text. The input text for the Text Timeline can come from a word processor, a text box, a text block, or any other type of text input.

The term "entity" refers to an animated element in a story. An object, a person, a character, and an animal are examples of an entity. For example, a chair can be an entity if the chair is animated. In this case, the chair can walk or talk for example.

It should be understood that the term "text" is used to describe any text related to the animation. A text can be a description of a scene, a description of an entity, a dialog, a description or instruction related to a camera such as an orientation of the camera or a zoom of the camera, a description or instruction related to the lighting of the scene, and the like.

BRIEF DESCRIPTION OF THE DRAWINGS

Further features and advantages of the present invention will become apparent from the following detailed description, taken in combination with the appended drawings, in which:

FIG. 3A is a block diagram illustrating the association of a block with an interface, in accordance with an embodiment;

FIG. 3B is a block diagram illustrating the association of icons with different entities, in accordance with an embodiment;

FIG. 3C illustrates square icons comprising a drawing of characters, in accordance with an embodiment;

FIG. 7E illustrates an organisation of icons, in accordance with an embodiment;

FIG. 7F illustrates the synchronization of icons, in accordance with an embodiment;

DETAILED DESCRIPTION

A text box, also called a block, may be used to enter text. The input text can also come from a word processor or any other type of text input, but a text box will be used throughout the description to simplify understanding and should not be construed as limiting. A traditional timeline located outside the text box is used for the timing and synchronization of events. The execution of the content of the text box is made in accordance with the timeline and the resulting scene is displayed in a window.

Figure 1A:
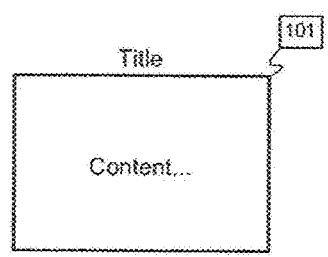
FIG. 1A is a block diagram of a block structure in accordance with an embodiment.
Figure 1B:
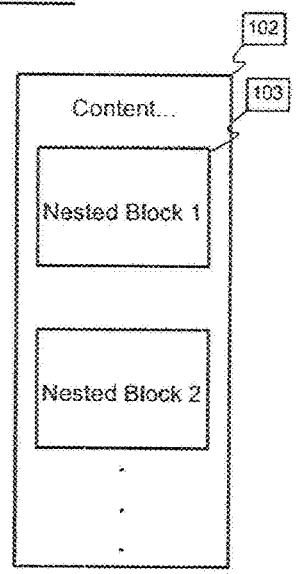
FIG. 1B is a block diagram of a compound block in accordance with an embodiment.

FIG. 1A illustrates a block 101 in accordance with one embodiment. Block 101 holds content and is the fundamental structure of the text timeline. Content can be defined as, but is not limited to, text, video, audio, images, spatial markers, time markers or action icons. A block can also have an optional title. While block 101 only contains content, a compound block 102 may hold both content and other nested blocks 103, as illustrated in FIG. 1B.

Figure 1C:
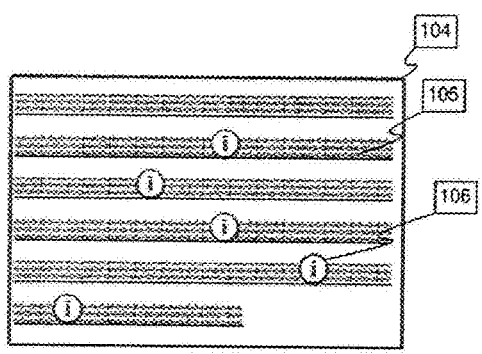
FIG. 1C is a block diagram of a heterogeneous block containing text and icons, in accordance with an embodiment.
Figure 1D:
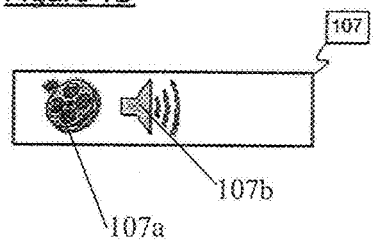
FIG. 1D is a block diagram of a heterogeneous block containing audio and video, in accordance with an embodiment.

The general arrangement of content within a block can be either homogeneous or heterogeneous. A homogenous block is one that contains only one type of content; for example, only text, or only video or only audio, etc. A heterogeneous block contains two or more types of content. FIG. 1C illustrates one embodiment of a heterogeneous block 104 which contains text 105 and icons 106. Icons 106 are representative of content other than text. Any type of content such as video, images, audio, etc, can be embedded within text 105. FIG. 1D illustrates one embodiment of a heterogeneous block 107 containing two types of content, namely, video 107a and audio 107b.

The positioning order of the content and/or icons representative of content within a block dictates the temporal order of execution of the content. When block 104 is activated, text 105 is executed. During the execution of text 105, the content associated with icon 106 is executed when this icon 106 is reached. For example, if icon 106 represents a video, this video is executed. When block 107 is activated, as audio icon 107b is located after video icon 107a, the video associated with video icon 107a is first executed and the execution of the audio track associated with audio icon 107a occurs once the execution of the video is completed.

In one embodiment, text holds a prominent position with respect to the other types of content since it is usually the primary tool for storytelling. All types of content other than text can be embedded within text in the form of commands or icons. For example, if a block containing text describes a scene, then other content can be inserted within the text to enrich the scene. At a certain point within the scene, background music may be added. This is done by adding a reference to an audio file directly within the text. The reference may be in the form of an icon, or by a textual command. It should be understood that any reference that can be inserted into a block can be used.

In all subsequent figures, a generic icon symbol of the type of icon 106 is used to represent any type of content other than text that can be embedded within text and the location of the icon within the text dictates the time at which the content associated with the icon is executed.

Figure 2:
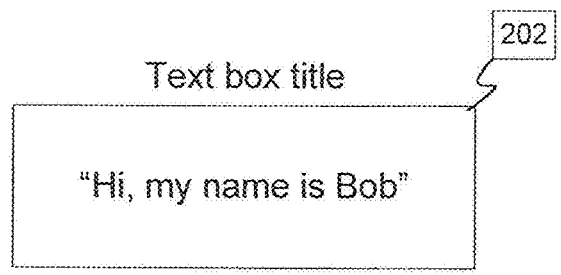
FIG. 2 is a block diagram of a block comprising a dialog, in accordance with an embodiment.

FIG. 2 illustrates one embodiment of a text box 202. Block 202 is used to describe the 3D scene, cause action to happen and write dialogs. Block 202 can also have an optional title. Block 202 contains the dialog "Hi, my name is Bob". When block 202 is activated, a character will say the line. The dialog text in block 202 is converted to speech using any type of text-to-speech technology known by a person skilled in the art. Block 202 can also contain actions such as "walking". In this case, the activation of block 202 makes the character walk, and the action text in 202 is converted to animation using any type of natural language processing technology known to a person skilled in the art.

FIG. 3A illustrates one embodiment of the association of an interface 303 with an icon 302. Icon 302 is embedded within text in a block 301 and is linked to enrichment features such as video, audio, action, time markers, spatial marker, etc. Icon 302 has parameters that can be changed through a user interface 303. Interface 303 might include, but is not limited to drop-down menus, dialog boxes, and the like. Examples of the parameters that can be changed are association, duration, delay, etc.

In one embodiment, icons are associated with an entity. FIG. 3B illustrates one embodiment of a block 304 containing icons 305 and 306 associated with different entities. In this embodiment, the shape of the icons is used to discriminate the entities. For example, circular icons such as icon 305 are associated with a first entity, such as "Bob", and square icons such as icon 306 are associated with a second and different entity such as "Mary". For example, in block 304, icon 305 associated with the entity "Bob" is set to "Make a scary face" and icon 306 associated with the entity "Mary" is set to "Jump". When block 304 is activated, the entity "Bob" makes a scary face which causes the entity "Mary" to jump. The content of block 304 is executed according to its position within block 304. In another embodiment, icons 305 and 306 can be associated with different parts of a same entity. For example, icon 305 is associated with the upper body of an entity such as "Bob" and icon 306 is associated with the lower body of the same entity, namely "Bob". For example, icon 305 is set to "Make a scary face" and icon 306 is set to "Jump". In this case, when block 304 is activated, the entity bob first makes a scary face and then jumps. The actions launched by icons 305 and 306 can be changed via an interface such as the one illustrated in FIG. 3A. It should be understood that an entity can be broken down into more than two parts and each part is controlled by a corresponding icon, each icon having a specific and unique shape. For example, the head, the torso the right arm, the left arm, the right leg and the left leg of the character can be associated with a corresponding icon having a unique shape. Each part of the entity is controlled by its corresponding icon.

In one embodiment, a color code is used to discriminate the entities. Each entity is associated with a unique color and icons having this color cause an action to be performed on or by the entity associated with the same color. All icons associated with a given entity share the same colour. Block 310 presents an example of a color code. For example, color 1 (white) is associated with an entity "Bob" and color 2 represented by horizontal lines is associated to a second and different entity such as "Mary". In block 307, all icons have the same shape and the color of icons 308 and 309 is used to discriminate the entities. For example, icon 308 has color 1 and is therefore associated with the entity "Bob" while icon 309 has color 2 and is associated with the entity "Mary". Icon 308 is set to "Make a scary face" and icon 309 is set to "Jump". When block 307 is executed, the entity "Bob" makes a scary face which causes the entity "Mary" to jump. This allows for a visual indicator of association between actions and entities.

In another embodiment, icons 308 and 309 are associated with different parts of a same entity. For example, icon 308 having the first color is associated with the upper body of an entity and icon 309 having the second color is associated with the lower body of the same entity. An entity can be broken down in more than two parts and each part is associated with a corresponding icon having a unique color.

It should be understood that any feature of the appearance of an icon can be used to create an association with an entity or a part of an entity. The shape, the size and the color of an icon are examples of features that can be used. In another example, all icons have the same shape and color but a drawing is inserted into the icons to discriminate the entities or the parts of a same entity, as illustrated in FIG. 3C. Icons 311 and 312 have the same square shape with a white background. A drawing of a female character and a male character are present at the center of icons 311 and 312, respectively, in order to show the icons 311 and 312 are associated with the characters "Mary" and "Bob", respectively. Alternatively, icon 312 could illustrate the legs of "Mary" and both icons 311 and 312 would be associated with the same entity but would control different parts of this entity. In another embodiment, the icon could have the shape of the entity or the part of the entity with which it is associated. For example, an icon associated with a table has the shape of a table, an icon associated with a dog is a drawing or picture of a dog, an icon associated with a cloud is a drawing or picture of a cloud, an icon associated with the upper body of Mary is a drawing of the upper body of Mary, etc.

In one embodiment, the appearance features used to discriminate entities or parts of an entity are automatically assigned by the software. For example, if a colour code is used to discriminate the entities, colours are automatically assigned by the software for each new entity created. However, the user has the ability to change the colours given. Each entity within a given scene has a specific and unique colour. No two entities can have the same colour within the same scene. Alternatively, colors can be set manually by the user.

Figure 4A:
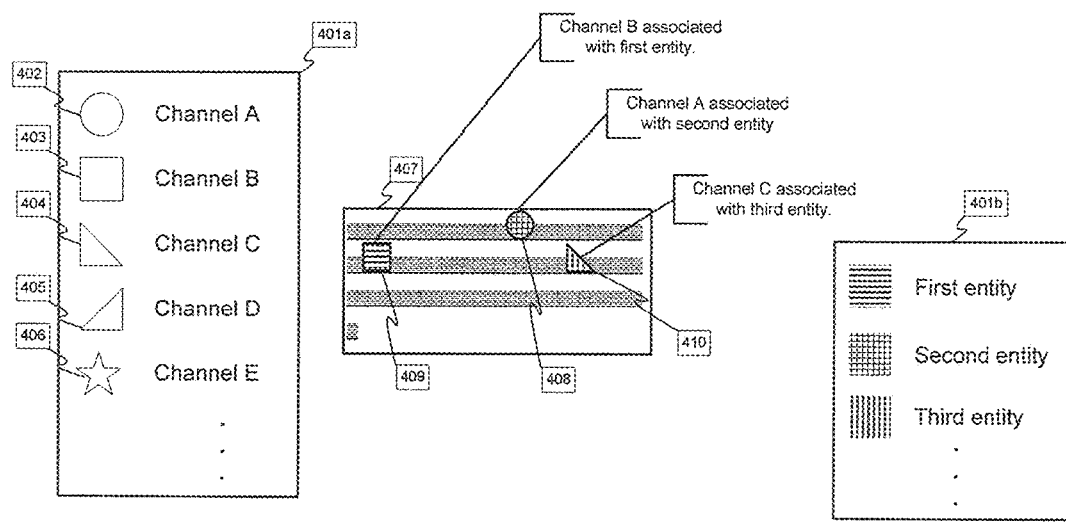
FIG. 4A illustrates a block, a box of channel icons and a color code, in accordance with an embodiment.

In one embodiment, a first feature of the appearance of icons is used to discriminate entities and a second feature of the appearance of the same icons is used to discriminate parts of the entities. For example, the color of an icon is used to represent the entity with which the icon is associated while the shape of the icon is used discriminate the parts of the entities, as illustrated in FIG. 4A. The box 401b presents different colors related to different entities. A first color represented by horizontal lines is associated with a first entity, a second color represented by squares is associated with a second entity and a third color represented by vertical lines is associated with a third entity. A box 401a presents empty icons 402-406, each having a different external shape. If the three entities are characters, each icons 402-406 is associated with a part of the characters' body. For example, icons 402-406 can be associated with the head, the chest, the arm, the foot, and the leg of a character, respectively. A part of an entity is called a channel. Each one of icons 402-406 is associated with a respective channel of an entity. The icons 402-406 are associated with an entity by selecting the appropriate color as illustrated in block 407. Icon 408 causes an action to be done by channel A of the second entity such as turning the head of the second character, icon 409 causes an action to be done by channel B of the first entity such as turning the chest and icon 410 is used to make an action on channel C of the third entity such as raising the arms.

The concept of Channels can be applied to any entity of the animation. The entity can be a character and the channels are associated with parts or members of a body, such as a right foot, eyes, etc. The entity can also be an object (which is traditionally inanimate) such as a chair. A channel can be associated with the legs of the chair (to walk) and another channel can be associated with the backrest which might incorporates a face, for example.

While FIG. 4A refers to icons of which the external shape (circular, square, triangular, etc) is used to identify the corresponding channel, it should be understood that other appearance features of the icons can be used to create the association with the channel. For example, the icon can have the shape of the channel with which it is associated. If channel A is a right hand, the icon used to control channel A can have the shape of a right hand. If channel B is a leg of a chair, its corresponding icon can have the shape of a leg of a chair. Alternatively, all icons can have the same outer shape, such as square, and can contain a drawing or picture of the channel with which they are associated with.

While FIG. 4A refers to icons of which the color is associated with an entity and the shape is associated with a part of the entity, the reverse is also possible. The color of an icon can be indicative of the channel and the shape of the icon can be associated with the entity. In another embodiment, the outer shape of the icon (such as square, circular, etc) can be indicative of the entity and a drawing or picture inside the icon can be indicative of the controlled channel. It should be understood that any appearance features of an icon can be used to create an association with an entity and a channel.

Figure 4B:
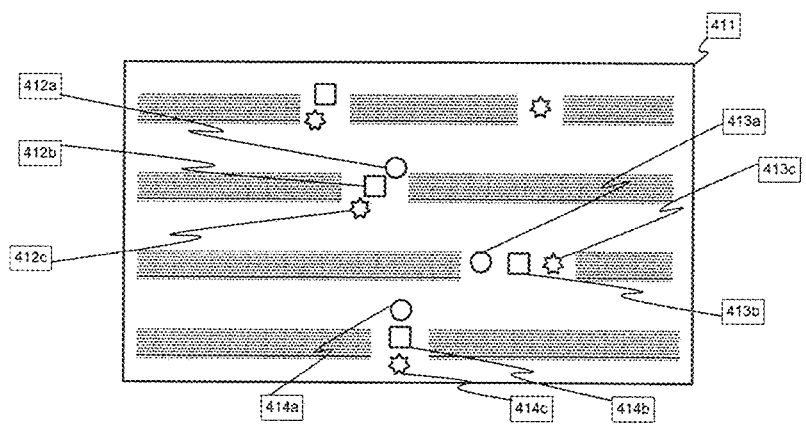
FIG. 4B is a block diagram of a block containing text and multi-channel icons, in accordance with an embodiment.

FIG. 4B illustrates one embodiment of a block 411 containing text and multi-channel icons 412a-c, 413a-c, 414a-c. Icons 412a-c, 413a-c, 414a-c are located between two parts of text. Icons can be placed horizontally one after the other such as icons 413a-c, vertically one on top the other such as icons 414a-c or they can also be placed vertically while being slightly shifted such as icons 412a-c. All icons located between two text parts can be executed successively or simultaneously such that their corresponding actions occur successively or simultaneously, respectively, in the animation. Yet another embodiment has the icons positioned above or below the text, but still positioned to correspond temporally with when a given action is to be triggered.

In one embodiment, each channel can have its own track. Taking the example of icons 413a-c in block 411, the space between the two text parts can be divided into three locations. The first location can be reserved for channel A (icon 413a), the second location for channel B (icon 413b) and the third position for channel E (icon 413c).

In one embodiment, the relative position of each track is logical: the head icon (circle) 414a is above the torso icon 414b (square) and that should be above the leg icon (star) 414c.

Figure 4C:
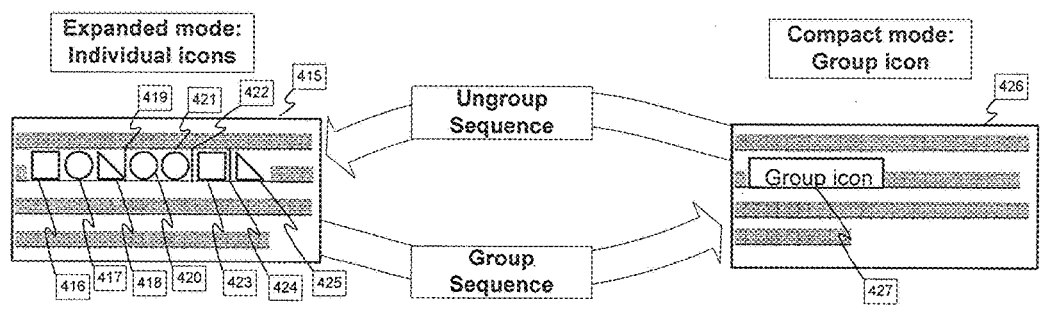
FIG. 4C is a block diagram illustrating the grouping of icons, in accordance with an embodiment.
Figure 4D:
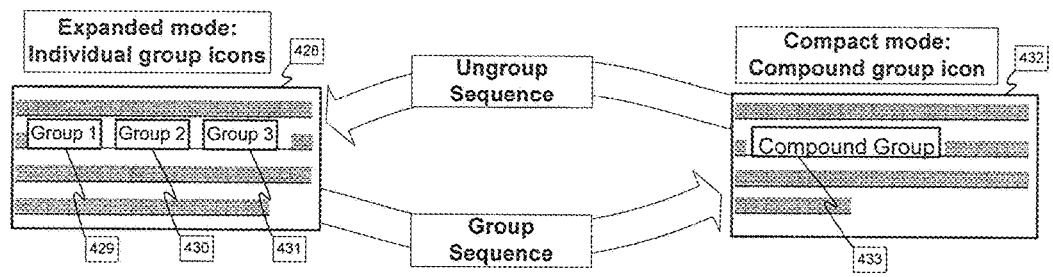
FIG. 4D is a block diagram illustrating the grouping of group icons, in accordance with an embodiment.

FIG. 4C illustrates one embodiment of the grouping of icons 416-425. For ease-of-use and aesthetic reasons, a continuous sequence of action icons 416-425 is grouped together under one group icon 427. The expression "continuous sequence" refers to an unbroken string of icons, which in this case are action icons. Group icon 427 represents the sequence, and it can be grouped and later ungrouped by the user. When a sequence is grouped, the entire sequence is contained in an icon block that represents the sequence. Group icon 427 can be moved within the text contained in block 426. When in this grouped form, the individual icons are not accessible to the user; they are only accessible when the sequence is ungrouped. FIG. 4D illustrates an embodiment of the grouping of group icons 429-431. Consecutive grouped sequences 429, 430 and 431 are put into a larger compound group icon 433. As in the case for group icons, compound group can be ungrouped by the user.

In one embodiment, icons representative of causal events can be grouped together to form a group icon which facilitates the manipulation of these causal events. Grouping causal events enables to keep track of all the causal events and to move them all together.

Figure 5:
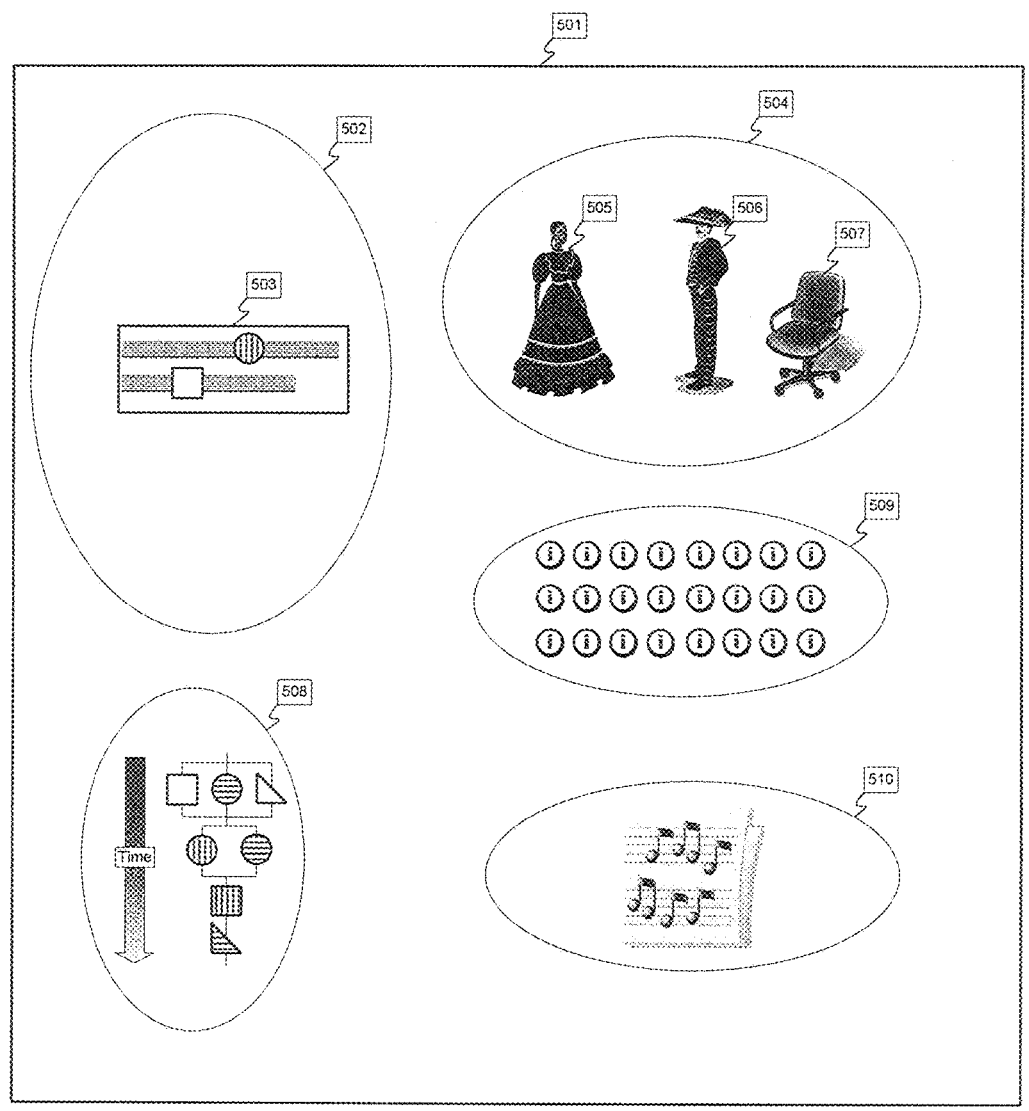
FIG. 5 is a block diagram of a user interface, in accordance with an embodiment.

FIG. 5 illustrates one embodiment of a user interface 501. User interface 501 consists of many elements, and in various formats. For example, user interface 501 may comprise a Text View 502, a 2D or 3D World View 504, an Icon Box 509, an Audio Track Interface 510 and an Action Icon Timing Interface 508. Text View 502 is the location for the text blocks 503. World View 504 can show the current 2D or 3D view of the scene. Icon box 509 can be a reservoir of icons. Audio Track Interface 510 can be a location to control and modify the audio track and Action Icon Timing Interface 508 is an interface to visualize and control the timing and synchronization of action icon sequences. Other elements could also be possible and be added to the interface.

Figure 6A:
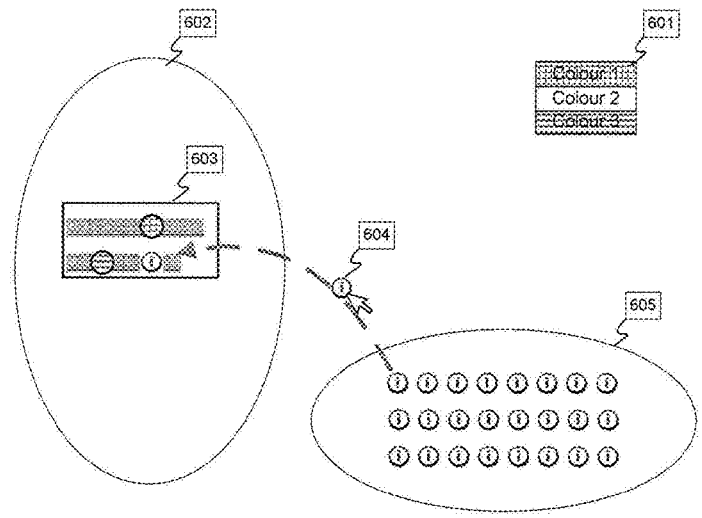
FIG. 6A is a block diagram illustrating a drag and drop method from an icon box for adding icons in a block, in accordance with an embodiment.
Figure 6B:
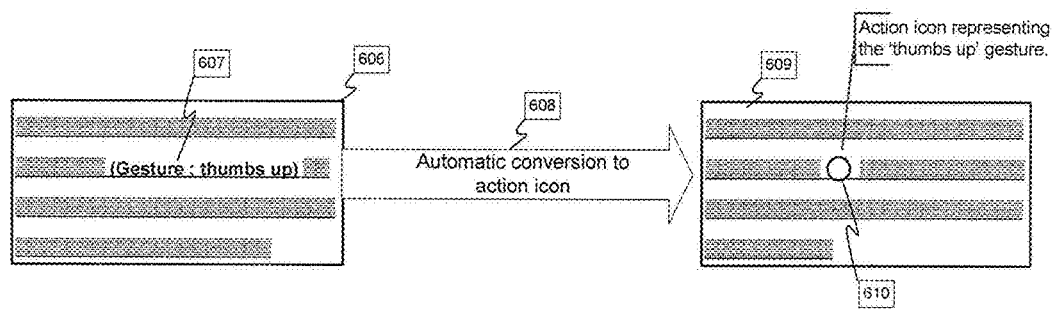
FIG. 6B is a block diagram illustrating a textual command method for adding icons in a block, in accordance with an embodiment.
Figure 6C:
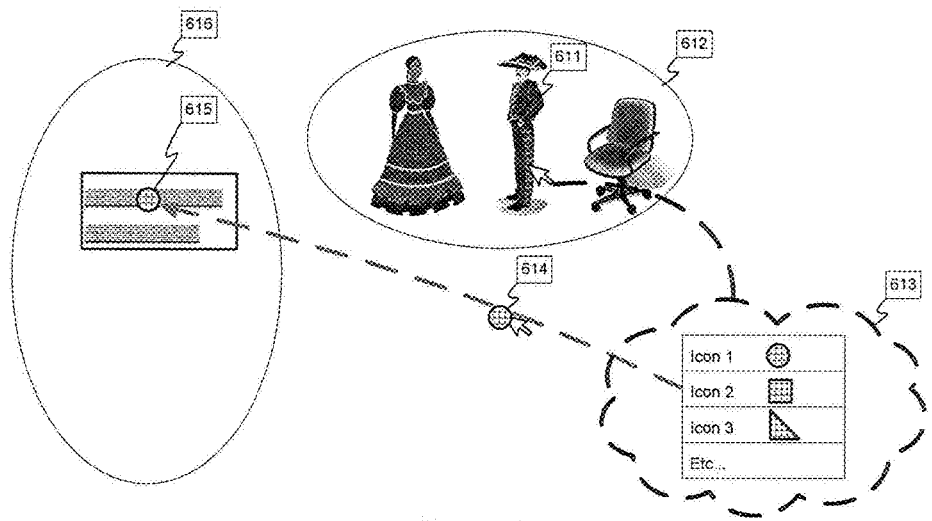
FIG. 6C is a block diagram illustrating a drag and drop method from a world view for adding icons in a block, in accordance with an embodiment.

FIGS. 6A, 6B and 6C illustrate three ways to add icons within text. FIG. 6A illustrates an embodiment of a drag and drop method from Icon Box 605. Icon 604 is dragged from the Icon Box 605 by a cursor into a text block 603 within the Text View 602. In one embodiment, once icons are dropped, they remain a neutral colour and the user has to assign icons to entities by way of a colour displayed in box 601, for example. In another embodiment, the icons are automatically assigned a color or shape as a function of the text box in which they are dropped.

FIG. 6B illustrates an embodiment of a textual command method for adding an icon. The user types the textual command 607 associated with an icon directly into block 606. The textual command 607 is then automatically converted to the proper icon 610. In one embodiment, once icons are dropped, they remain a neutral colour and the user has to assign a colour corresponding to the desired entity. In another embodiment, the icons are automatically assigned a color or shape as a function of the text box in which they are dropped.

In one embodiment, the words that are typed to convert to a given icon can be predetermined as in 'walk' or 'thumbs up' to specify a walk icon or a thumbs up icon, or they can be text interpreted by natural language processing (NLP). An NLP based system would take a description and attempt to understand the user's intentions and insert the appropriate icon within the block. For example, the user writes "walk" and the system recognizes that the "walk" action is related to the legs and converts the text command into the appropriate channel (leg) icon. In another example, if the user wrote "point the thumbs up then turn it down", the NLP system would interpret this to mean the insertion of a thumbs up icon followed immediately by a thumbs down icon.

FIG. 6C illustrates a method of drag and drop from a world view 612 according to one embodiment. Icons are chosen from a user interface 613 that emerges when an entity 611 is selected. The icon 614 is placed at the appropriate point in the text 615 and it is automatically assigned the colour of the selected entity 611. Alternatively, once icons are dropped, they remain a neutral colour and the user has to assign a colour.

Figure 7A:
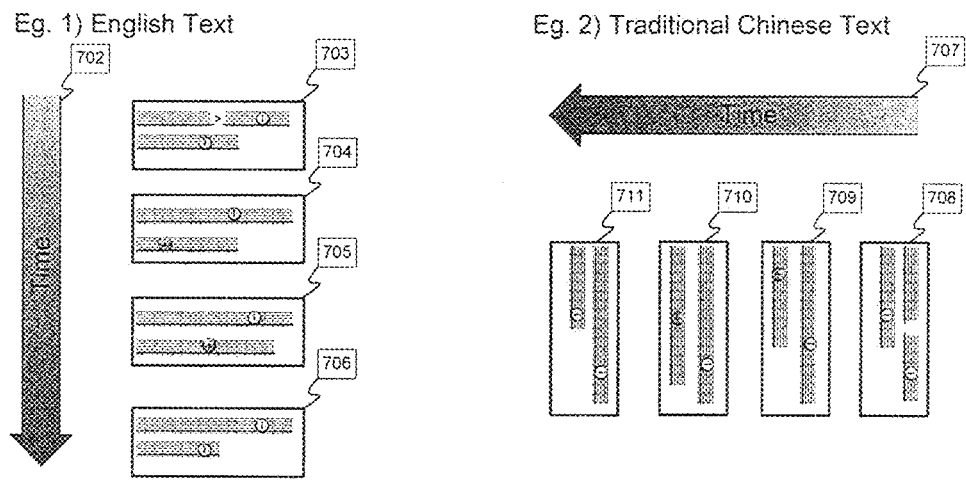
FIG. 7A illustrates the positioning of blocks for different languages, in accordance with an embodiment.

In one embodiment, the order of the blocks determines their order of execution. The direction horizontal or vertical is language specific, depending on how sentences within the language are written, as illustrated in FIG. 7A. English sentences, for example, are written from the top of the page to the bottom, so the corresponding blocks would run vertically and would execute from top 703 to bottom 706 as time goes by 702. For traditional Chinese, the sentences are written vertically and start on the right of the page and go to the left. For this language, the blocks would start executing from the right 708 to the left 711 as time goes by 707.

Figure 7B:
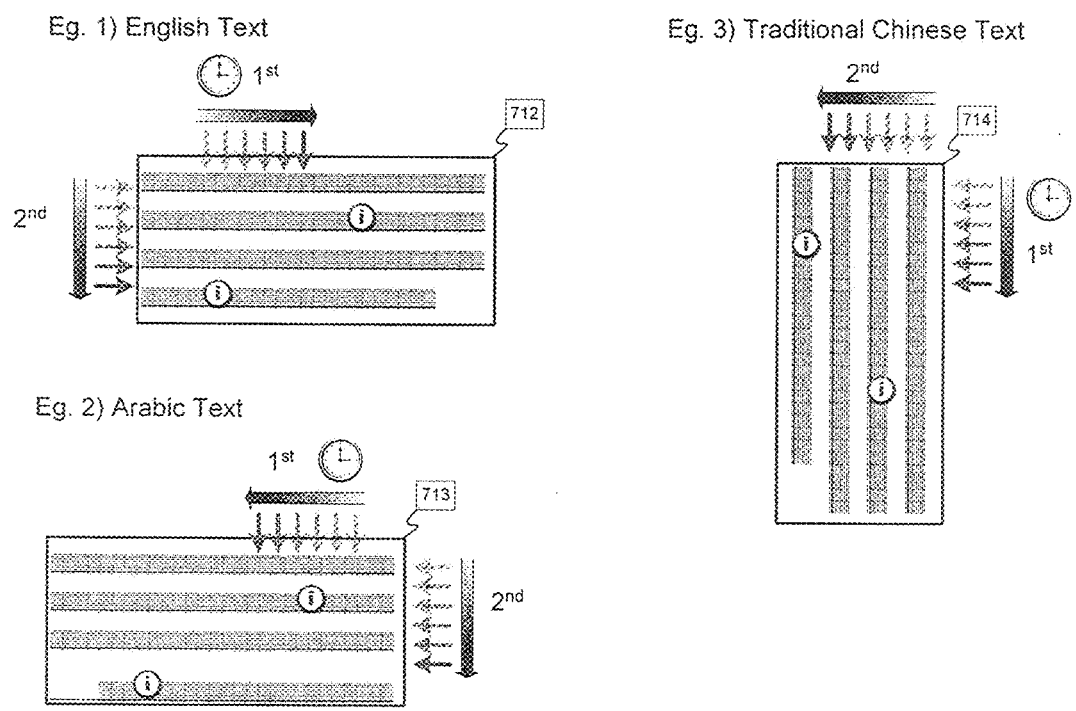
FIG. 7B illustrates the execution within a block for different languages, in accordance with an embodiment.

In the same or a further embodiment, timing and synchronization within the blocks is controlled mainly via text or dialog, as illustrated in FIG. 7B. The text determines the point at which embedded action icons are executed. The execution within the block is carried out similarly to the way the text would be read within the block. The exact direction of execution would be language specific, and any language writing style could be accommodated; i.e. for an English block 712, it would read from left to right along a horizontal line, then down through the lines. An Arabic block 713, would read from right to left, then down the lines. Modern Chinese would read similar to English. Traditional Chinese 714 would be completely different and would first read vertically from top to bottom, then horizontally from right to left. Dialog is converted to speech and icons are triggered at their location within the text. Icons can have delays as a parameter setting, so that more precise control over the timing is possible.

Figure 7C:
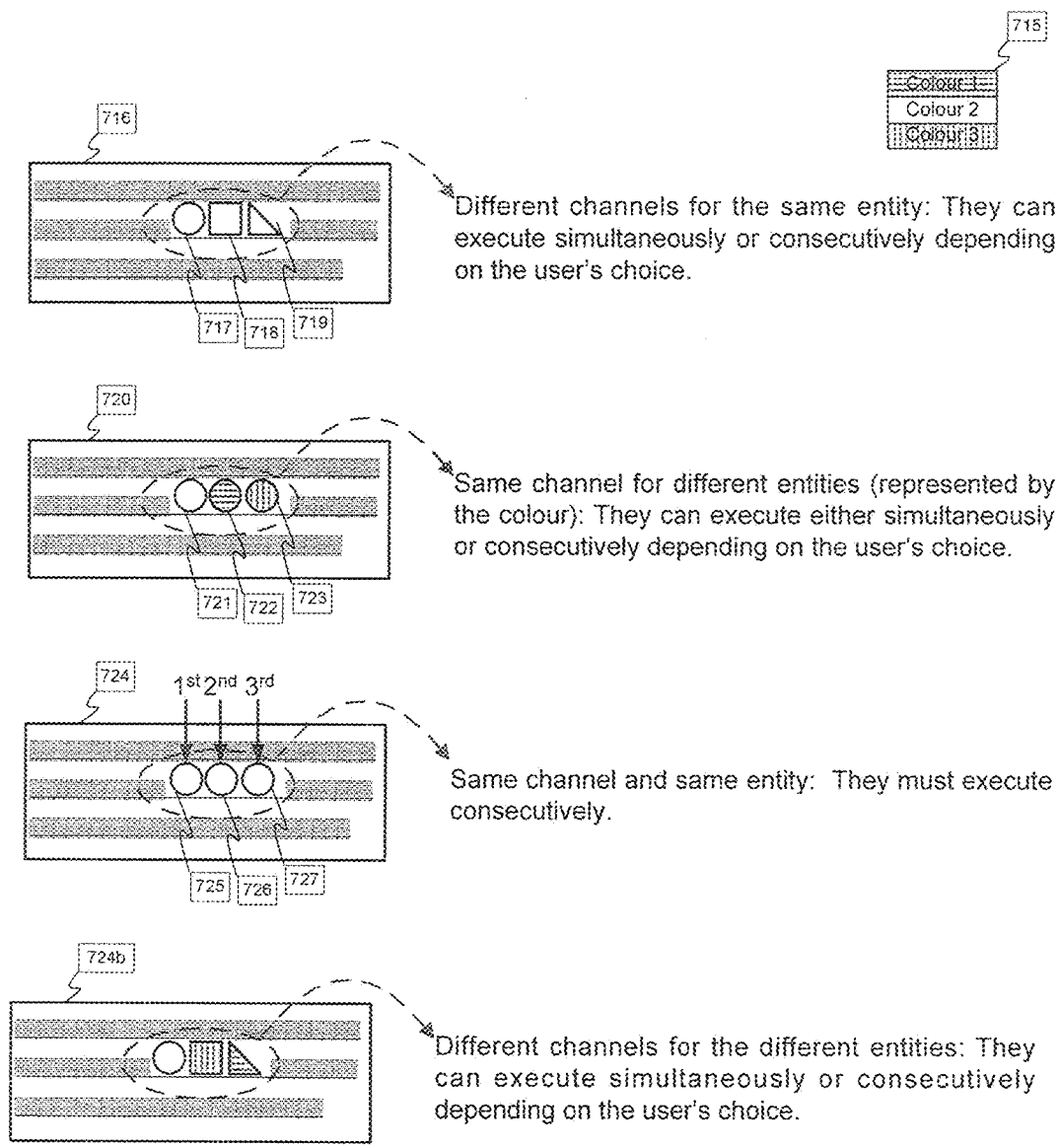
FIG. 7C illustrates a rule of interfering action icons, in accordance with an embodiment.

Yet another option, to be used separately or in combination with the above techniques, the order and type of action icons determines the timing of their execution, i.e. the execution of action icons follows specific rules when several action icons are placed one after the other in the text. Many rules are possible, illustrated by the following two rules for action icons:

Rule 1—The rule of interfering action icons: sequential action icons will either be executed consecutively or simultaneously depending on whether they interfere or not, as illustrated in FIG. 7C. If a combination of action icons does not interfere, then by default they run simultaneously. The user has the option to change the execution timing to have them execute consecutively. Combinations that do interfere are forced to execute consecutively. For example, action icons within different channels 717, 718, and 719 will never interfere no matter what entity they are associated with and so they can execute as either simultaneously or consecutively depending on what the user wants. Similarly, action icons associated to different entities 721, 722 and 723 will also never interfere no matter what channel they represent and therefore can run simultaneously or consecutively. However, action icons associated with the same entity and channel 725, 726 and 727 will always interfere and therefore must be executed consecutively i.e. the same channel cannot be doing two different actions at the same time. When a text box 724b contains icons associated with different channels for different entities, the icons can be executed consecutively or simultaneously.

Figure 7D:
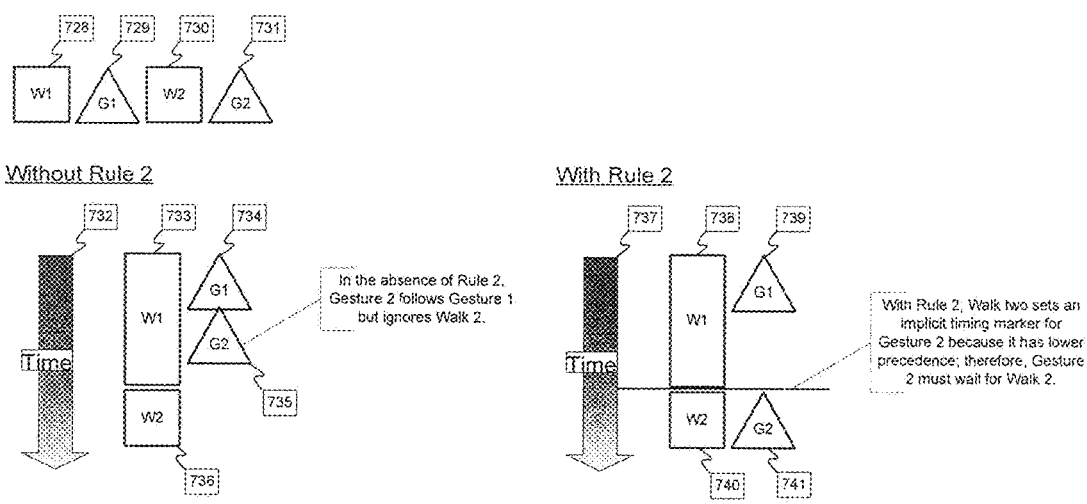
FIG. 7D illustrates a rule of mutable priority via channel type hierarchy, in accordance with an embodiment.

Rule 2—The rule of mutable priority via channel type hierarchy: this rule dictates the execution timing of action icons based on a hierarchy of action icon types. The exact hierarchy of action icon types is itself variable both in number and precedence. An example of a hierarchy from higher to lower precedence is as follows: Walks, Postures, Gestures, Looks, Facial Expressions. Any action icon with a higher precedence will create an implicit timing marker for all action icons with a lower precedence even though they don't interfere. For example, referring to FIG. 7D, consider the following: icon 728 represents walk one W1, icon 729 represents gesture one G1, icon 730 represents walk two W2, and icon 731 represents gesture two G2. Let both gesture one and gesture two apply to the left arm channel triangle, while the two walks apply to the leg channel square. Consider the execution timing with the following sequence: W1, G1, W2, and G2. W1 and G1 are not on the same channel and therefore do not interfere and can run simultaneously. However, W1 and W2 are on the same channel and interfere based on Rule 1. Therefore, W2 can only start after W1 is finished. G1 and G2 also interfere with each other and therefore must run consecutively; however G2 does not interfere with either W1 or W2, therefore it is possible that G2 would execute immediately after G1, whether or not W2 has begun, as illustrated in FIG. 7D (732, 733, 734, 735 and 736). However, Rule 2 forbids this from happening because W2 has higher precedence than G2, and G2 was placed after W2. Therefore, G2 must wait for W2 to start which only happens after W1 has ended, as illustrated in FIGS. 7D (737, 738, 739, 740 and 741). For example, if W1 is a very long walk, this rule will determine whether gesture G2 happens during the long walk, or after it. If the user wants G2 to happen immediately after G1, then he needs to place G2 before W2, as illustrated in FIG. 7E.

Yet another way of controlling timing and synchronization is to have a separator symbol forcing the synchronization of action icons. A visual method of forcing synchronization to be consecutive is achieved with a separator symbol. In one embodiment, the symbol '|' (748, 749) is chosen as the separator symbol as illustrated in FIG. 7F. Other examples of separator characters are a space, "*", "/", etc. Placement of the separator symbol between two channel icons represents the condition where the two actions are forced to execute consecutively, as illustrated in block 747, even though they could otherwise execute simultaneously. The absence of the character in the same situation would mean a simultaneous execution, as illustrated in block 746. The exception to this would be a situation where two icons interfere. In this situation, the actions cannot be executed simultaneously even without the special character because of the interference in this case there is an implicit separator symbol.

Figure 8A:
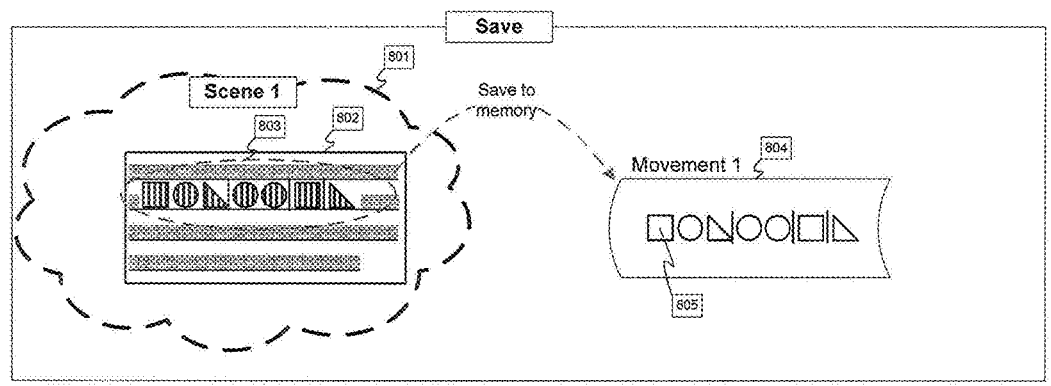
FIG. 8A illustrates the saving of an action icons sequence when only one entity is involved, in accordance with an embodiment.

FIG. 8A illustrates one embodiment of the saving of an action icon sequence 803 when only one entity is involved. This is useful when complicated action sequences 803 are repeated within a scene or between scenes. In one embodiment, the association of the colour is lost when it is saved into memory 804; i.e. the colour no longer signifies an association to an entity 805.

Figure 8B:
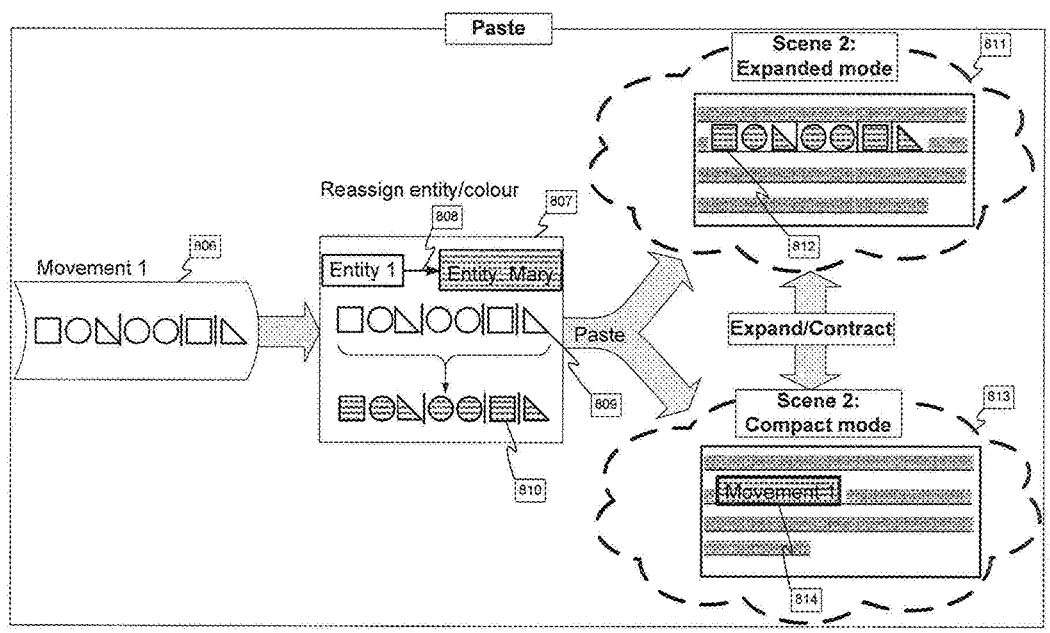
FIG. 8B illustrates the pasting of an action icon sequence when only one entity is involved, in accordance with an embodiment.

FIG. 8B illustrates one embodiment of the pasting of an action icon sequence 806 when only one entity is involved. The sequence 806 is to be reassigned to an entity 808 within the new scene and it will adopt the colour of the new entity 809 and 810. When the sequence is pasted, the user has the choice of pasting it as one block shown as Movement 1 814 or as the expanded sequence showing all action icons 812. The user is able to easily switch back and forth between the compact and expanded modes. When it is in the expanded mode, the user has the ability to modify each action icon independently.

Figure 8C:
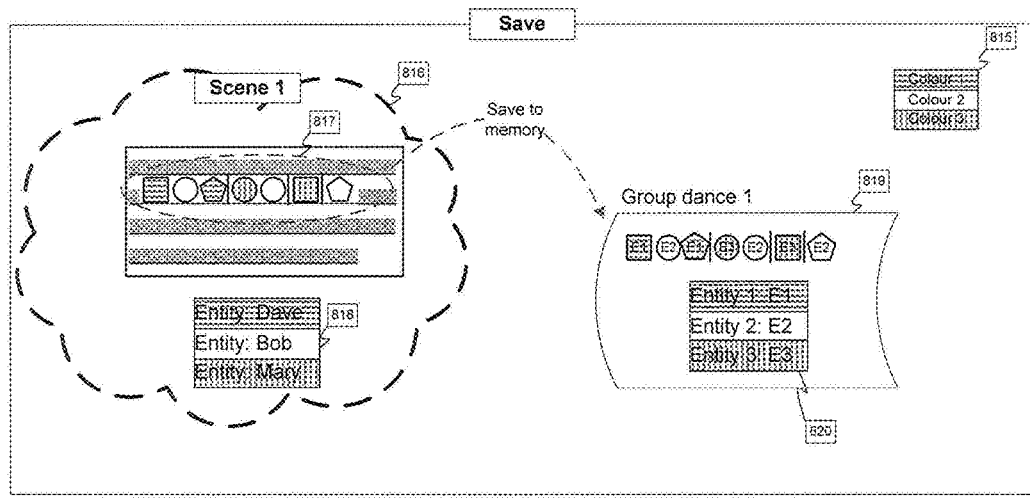
FIG. 8C illustrates the saving of an action icon sequence when multiple entities are involved, in accordance with an embodiment.
Figure 8D:
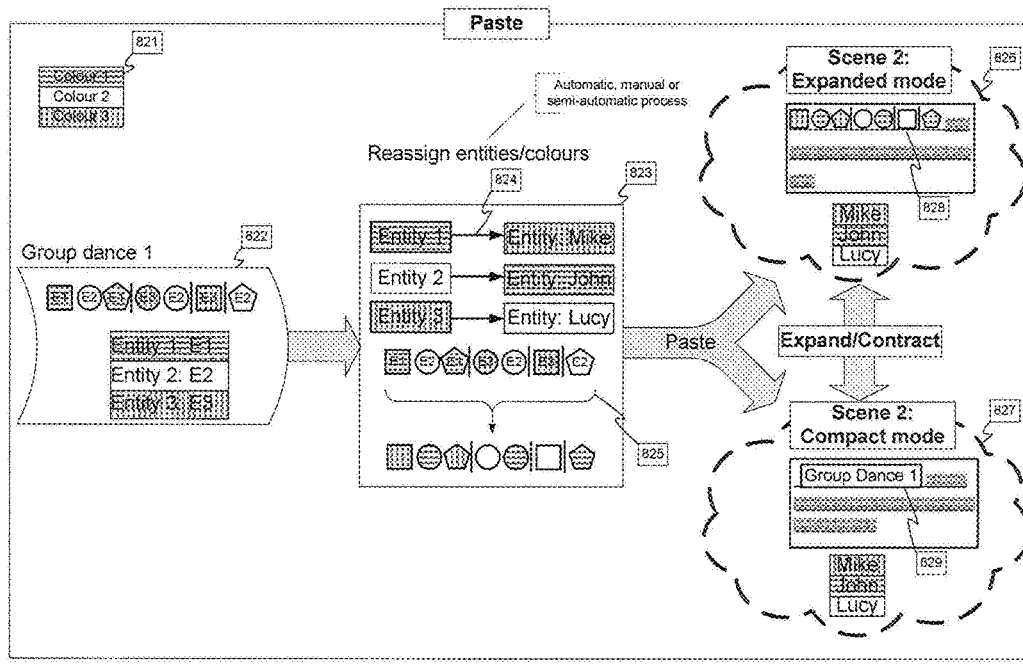
FIG. 8D illustrates the pasting of an action icons sequence when multiple entities are involved, in accordance with an embodiment.

FIG. 8C illustrates one embodiment of the saving of an action icon sequence 817 when multiple entities are involved. FIG. 8D illustrates one embodiment of the pasting of an action icon sequence 806 when multiple entities are involved. When a sequence for multiple entities is pasted, the number of entities contained in the scene must be equal or greater than the number of entities contained in the sequence and all the entities are reassigned 823 and 824. For example, if a sequence called "Group dance 1" 822 contains three entity colours, then the scene into which it is pasted must contain at least three entities. The colours of the pasted sequence are reassigned to entities in the new scene 826 and 827; this reassignment can be done automatically by the software, manually by the user, or some combination of both. The association of the colour to a particular entity is lost when it is saved. Instead the colours are associated with generic entities 820. For example, the specific entities "Dave", "Bob" and "Mary" within the scene are replaced with the generic entities "Entity 1", "Entity 2" and "Entity 3" in memory 819.

In one embodiment, during the "paste" procedure, each generic entity within the saved sequence (E1, E2, etc) is reassigned to a particular entity 824 within the new scene (Mike, John, etc). Since each generic entity within the saved sequence is coloured, the assignment of new entities (from the new scene) depends on the colours already in use in the new scene. The choice of assignment for the colours might be done automatically by software that makes all colour choices based on default rules, manually the user has complete control, or some combination of both where the software makes suggestions of colour assignments and the user has to validate the suggestions. The paste process allows the sequence to be pasted in either a compact form 829 or an expanded form 828. The expanded form will have all the icons visible and accessible while the compact form will have the action sequence contained in a single group icon, "Group dance 1" for example.

Figure 9A:
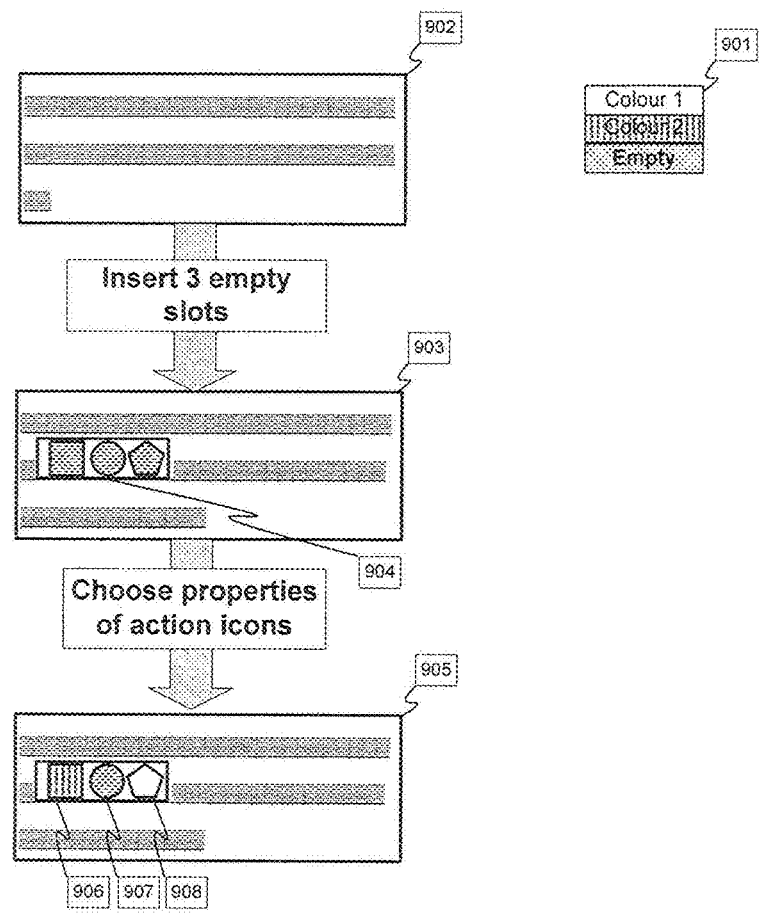
FIG. 9A illustrates simplified synchronization slots, in accordance with an embodiment.
Figure 9B:
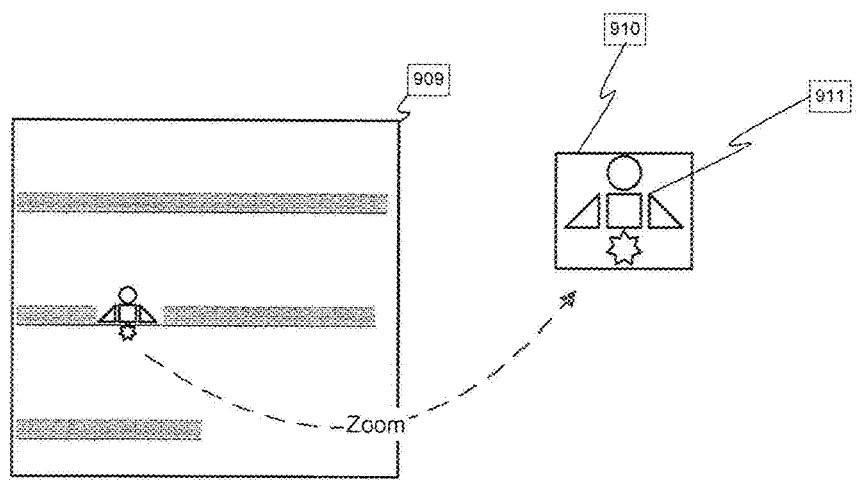
FIG. 9B illustrates slots having a vertical aspect, in accordance with an embodiment.

FIG. 9A illustrates an embodiment of synchronization slots. Slots are available to users who might not understand the synchronization rules or for those users unwilling to learn the rules, such as first time users or children for example. Each insert will have a given number of empty slots of predetermined channels 904. The user can fill in the slots with the appropriate action icons 906 and 908, or he can simply leave them empty 907. The advantage of these slots is that they have predetermined synchronization rules which make their use simple. FIG. 9B illustrates one embodiment of a slot 910 having a vertical aspect. Action icons 911 can be placed one on top of the other to either simplify the understanding of the synchronization or to make it more appealing to children, for example.

Figure 10:
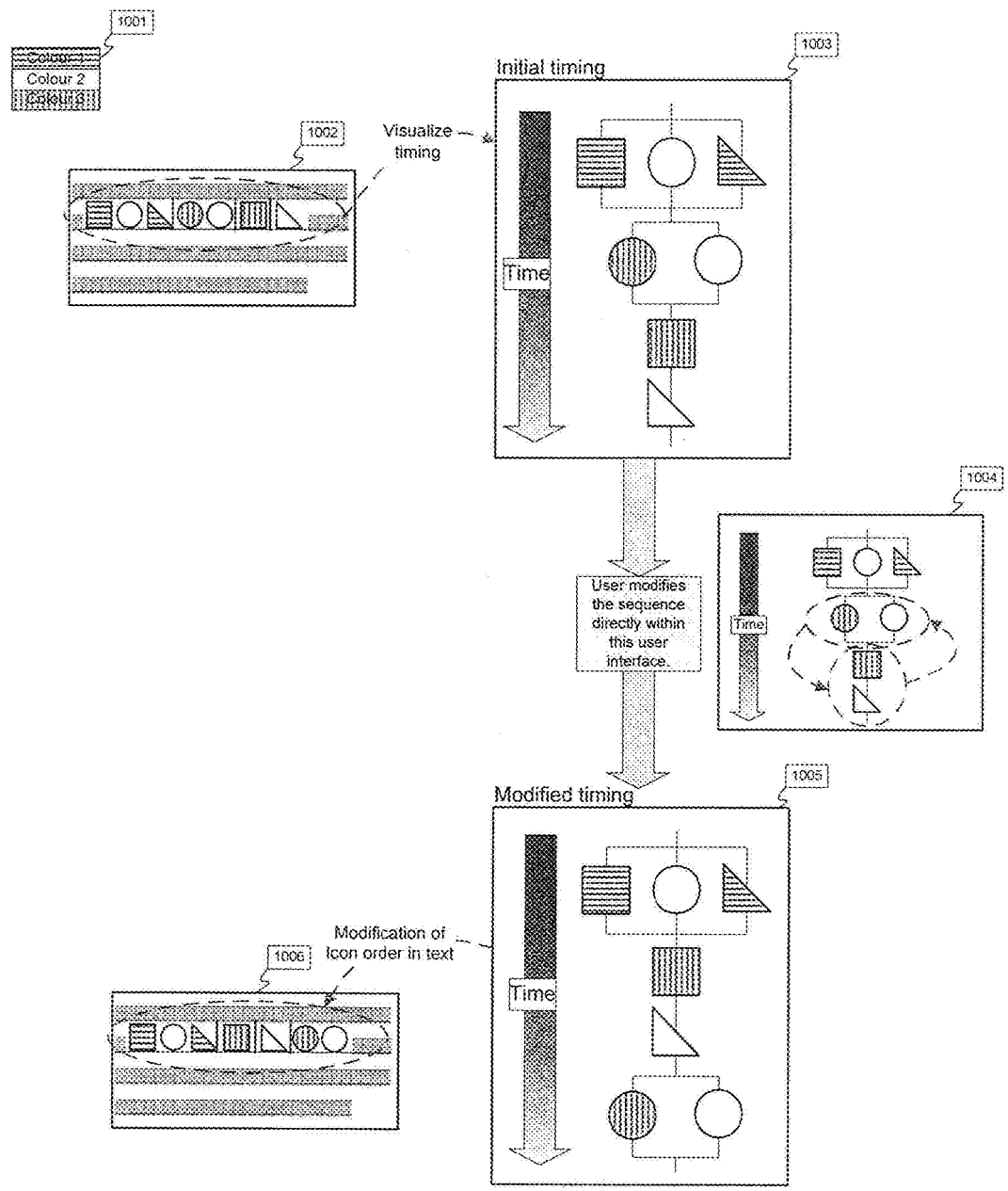
FIG. 10 illustrates a method for visualizing action icon synchronization, in accordance with an embodiment.

FIG. 10 illustrates an embodiment of a method for visualizing action icon synchronization. A user interface 1003, 1004 and 1005 helps the user to visualize the timing of action icon sequences placed within the text 1002. The purpose is to give the user a more visual and intuitive view of the synchronization of the action icons placed within the text. User interface 1003, 1004 and 1005 helps the user to understand the flow of the story. The interface is interactive so that the user can modify the sequence timing directly 1004. Any modification of the timing done directly in the interface will then be reflected in the original text block 1006.

Figure 11A:
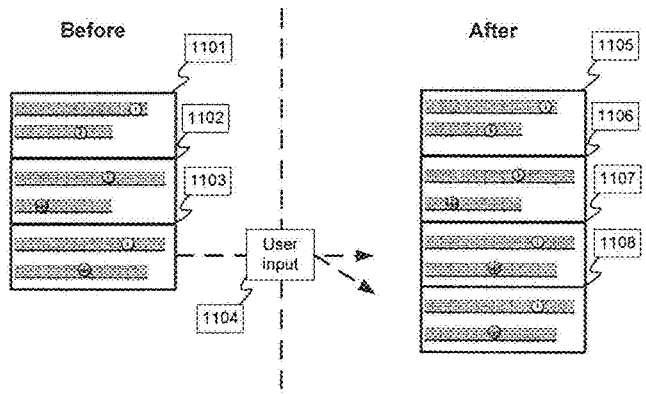
FIG. 11A illustrates a duplication of a block, in accordance with an embodiment.
Figure 11B:
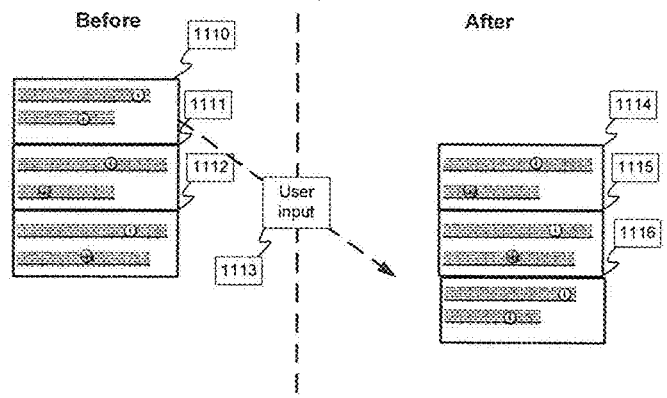
FIG. 11B illustrates a move of a block, in accordance with an embodiment.
Figure 11C:
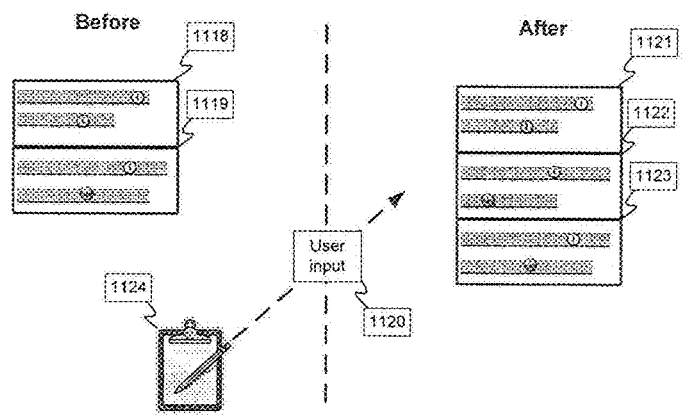
FIG. 11C illustrates an insertion of a block from clipboard, in accordance with an embodiment.
Figure 11D:
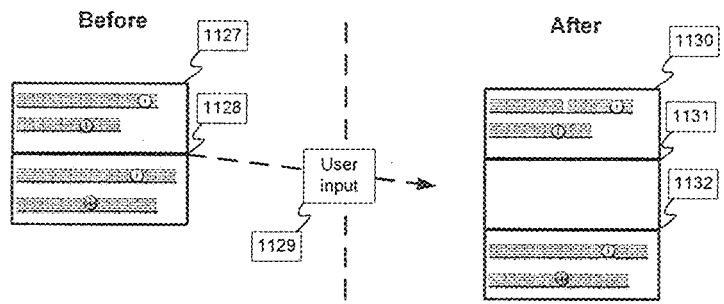
FIG. 11D illustrates an insertion of a new block, in accordance with an embodiment.
Figure 11E:
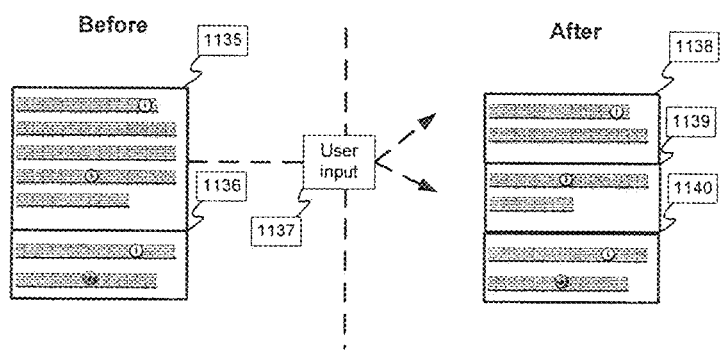
FIG. 11E illustrates a division of a block, in accordance with an embodiment.
Figure 11F:
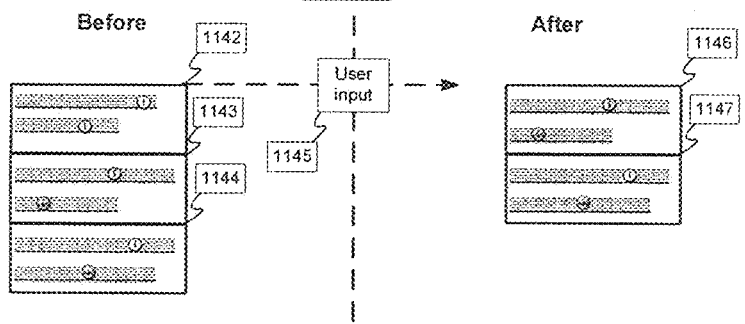
FIG. 11F illustrates a deletion of a block, in accordance with an embodiment.
Figure 11G:
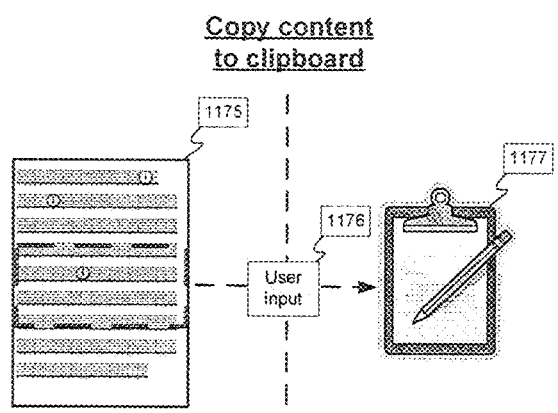
FIG. 11G illustrates the copying of content of a block to clipboard, in accordance with an embodiment.
Figure 11H:
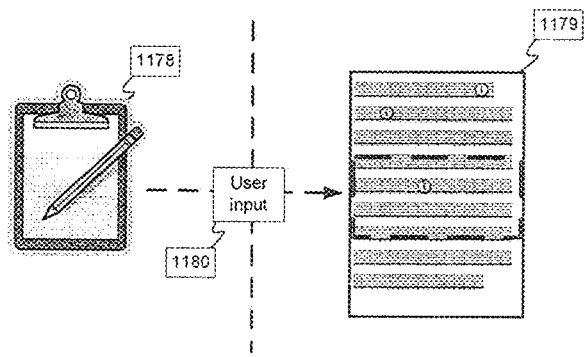
FIG. 11H illustrates the pasting content from clipboard within a text of a block, in accordance with an embodiment.

FIGS. 11A to 11H illustrate examples of modifications allowed on the blocks. In FIG. 11A, block 1103 is duplicated to give rise to blocks 1107 and 1108. In FIG. 11B, block 1110 initially on top of block 1111 is moved below block 1112. In FIG. 11C, block 1122 is inserted between blocks 1121 and 1123 from clipboard 1124. In FIG. 11D, an empty block 1131 is inserted between blocks 1130 and 1132. In FIG. 11E, block 1135 is divided into two blocks 1138 and 1139. In FIG. 11F, block 1142 is deleted. FIG. 11G illustrates a method for copying some content of a block 1175 to clipboard 1177. FIG. 11H illustrates an embodiment of a method for pasting content from a clipboard 1178 to a block 1179. The pasted content is embedded in the text of block 1179.

The modifications of blocks illustrated in FIGS. 11A to 11H are only exemplary. It should be understood that any modifications known by a person skilled in the art can be used.

It should be understood that icons associated with entities can be used to create 1D, 2D or 3D animations.

In one embodiment, a machine comprising a processor and a memory is adapted for creating an animation using icons. An application coupled to the processor is configured for inserting at least one icon within a text related to the animation in accordance with the method described above. The text is displayed on a display unit and can be input by a user via a user interface comprising an input device such as a keyboard, for example. Alternatively, the text may be present in the memory or received via communication means. The user positions the icons in the text using the user interface. Each icon is associated with a corresponding action to be performed by an entity. The user inserts each icon at a position in the text corresponding to the point in time at which the corresponding action is to be performed in the animation. Each icon has a feature that is associated with the entity which will perform the corresponding action in the animation. The application is further configured for executing the text and the icons in order to generate the animation. The application executes the text and each time an icon is reached, the application determines the action information related to the icon. The action information comprises all needed information for creating the action in the animation. For example, the action information comprises the type of the action associated with the icon, the start time of the action which is determined using the position of the icon in the text, the entity performing the action which is determined using the feature of the icon, and the like.

Figure 12:
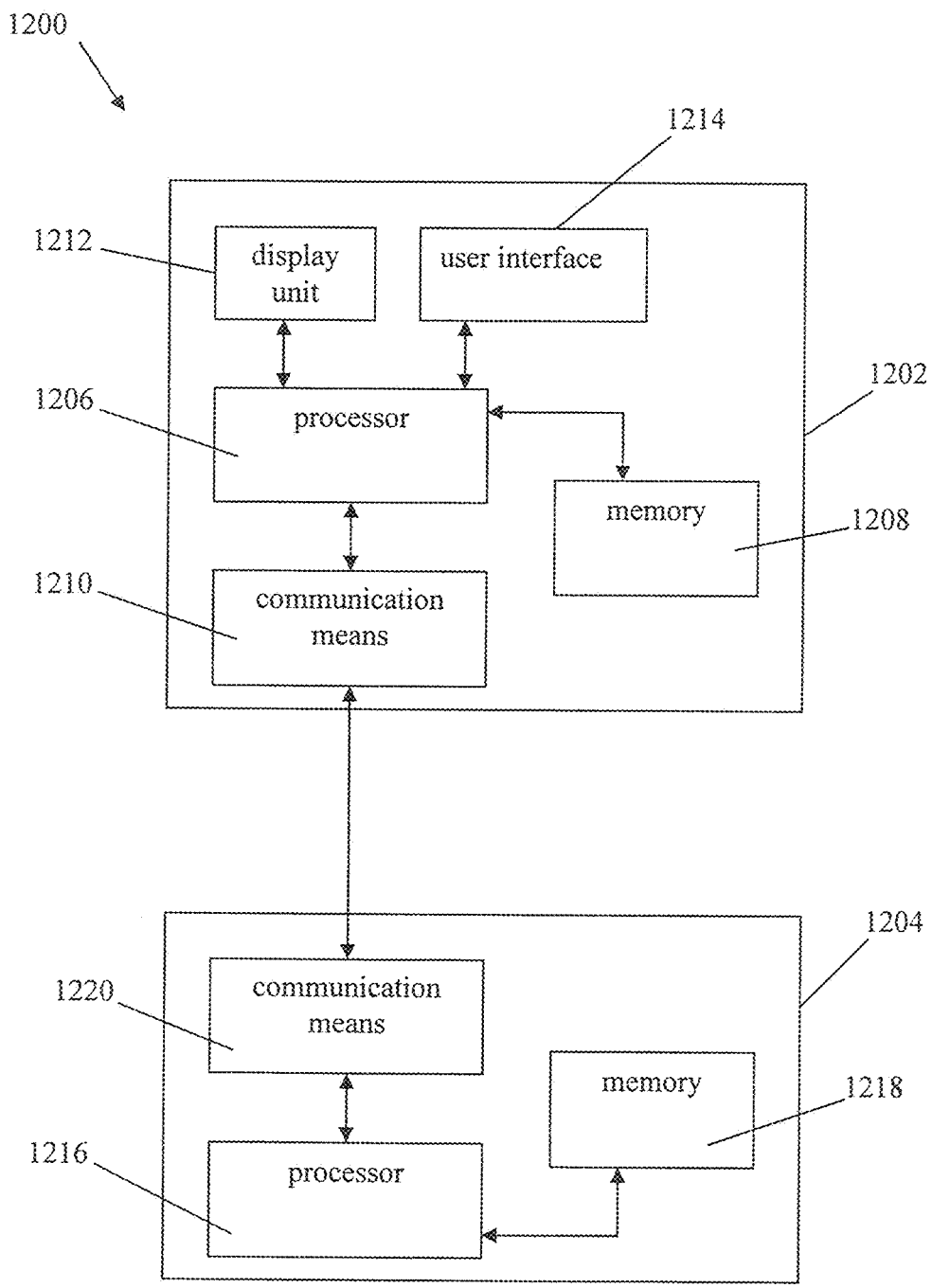
FIG. 12 is a block diagram of a system for generating an animation, in accordance with an embodiment.

FIG. 12 illustrates one embodiment of a system 1200 for creating an animation. The system 1200 comprises a computer 1202 connected to a server 1204 via a network. Examples of a network comprise an Internet, a local area network, a wide area network, a virtual private network, and the like. The computer 1202 comprises a processor 1206, a memory 1208 communication means 1210, a display unit 1212, and a user interface 1214 comprising an input device. The server 1204 comprises a processor 1216, a memory 1218, and communication means 1220.

The processor 1206 is coupled to an application Configured for inserting at least one icon within a text related to the animation in accordance with the method described above. The user of the machine 1202 inputs the text via the user interface 1214. Alternatively, the text may be uploaded from the memory 1208 or received from the communication means 1210. The text is displayed on the display unit 1212 such that the user can insert icons in the text. Each icon is associated with a corresponding action to be performed by a corresponding entity. The position of each icon in the text corresponds to the point in time at which the corresponding action is to occur in the animation. Furthermore, a given feature of the appearance of each icon is associated with the corresponding entity. The application coupled to the processor 1206 is further configured for sending animation information to the server 1204 and receiving the animation from the server 1204 via communication means 1210. The animation information comprises all of the information required for creating the animation. For example, the animation information comprises the text related to the animation and a description of the action to be performed such as the type of actions, the entities performing the actions, the start time of the actions, the duration of the action, etc.

The processor 1216 is coupled to an application configured for receiving the animation information from the computer 1202 via the communication means 1220, generating the animation using the animation information, and sending the animation to the computer 1202 via the communication means 1220. The resulting animation comprises the actions associated with the icons. The start time of each action in the animation corresponds to the position of the corresponding icon within the text.

Once the animation is created on the server 1204, the animation is sent to the computer 1202 and stored in memory 1208. The user can display the animation on the display unit 1212.

In one embodiment, the server 1204 receives the text related to the animation and the icons inserted in the text from the computer 1202. In this case, the application coupled to the processor 1206 is configured for sending the text and the icons to the server 1204. The application coupled to the processor 1216 is configured for determining the animation information using the received text and icons in order to generate the animation. The application executes the text and each time an icon is reached, the application determines the action information related to the icon. The application is configured for determining the type of the action associated with the icon, the start time of the action using the position of the icon in the text, and the entity performing the action using the feature of the icon. For example, a circular icon may be associated with the head of an entity and yellow may be associated with the entity "Jim". In this example, the head can only perform a single action, namely "smiling". When it encounters the circular and yellow icon, the application coupled to the processor 1216 determines the action "Jim smiling". The start time of the "Jim smiling" action is defined by the position of the yellow and circular icon in the text. A predetermined duration may be associated with the "smiling" action.

In one embodiment, icon parameters are associated with an icon. For example, the icon parameters can comprise the type of the action associated with the icon, the duration of the action, and the like. Referring back to the yellow and circular icon, more than one action may be associated with a circular icon, For example, the actions "smiling" and "grimacing" can be associated with the icon. In this case, the chosen action to be associated with the icon is defined in the icon parameters. The duration of the action can also be defined in the icon parameters. For example, the icon parameters may be set to the "smiling" action and to 2 second duration. In this embodiment, the user defines the icon parameters, and the application coupled to the processor 1206 is further configured for sending the icon parameters of each icon to the server 1204. The application coupled to the processor 1216 is further configured for generating the animation using the icon parameters associated with each icon.

In one embodiment, the application coupled to the processor 1206 is configured for determining the animation information using the text and the icons inserted in the text. If icon parameters are associated with the icons, the application also uses the icon parameters to generate the animation information. In this case, the animation information comprises the text related to the animation and the action information which defines all of the actions associated with the icons. The application coupled to the processor 1206 is further configured for sending the text and the action information to the server 1204. The application coupled to the processor 1216 is configured for receiving the transmitted text and the action information, and for generating the animation using the text and the action information.

It should be understood that the application coupled to the processor 1216 of the server 1204 can use any method known to a person skilled in the art for generating the animation using animation information.

It should be noted that the embodiments of the invention described above are intended to be exemplary only. The scope of the invention is therefore intended to be limited solely by the scope of the appended claims.

We claim:

1. A method for creating an animation using text, the method comprising:

receiving from a text input, a text comprising one or more entities and one or more events, the events comprising one or more of: actions to be performed by an entity or by a part of the entity, and words to be transformed into speech;

receiving a user input inserting at least one icon within the text, said at least one icon for embedding a non-textual content into the text;

generating the animation for display on a display unit, the generating comprising executing the text and said at least one icon;

wherein executing the text comprises constructing a visual depiction of the text and performing one or more of: generating a visual depiction of the actions performed by the entity or by the part of the entity, and converting the words into a speech using a text-to-speech module; and wherein executing said at least one icon includes executing the non-textual content of the icon wherein said execution occurs at a point in time corresponding to a position of said at least one icon in said text, said point in time being equivalent to the time at which an order of execution reaches the at least one icon in the text.

2. The method as claimed in claim 1, wherein said inserting at least one icon comprises inserting a plurality of icons at a same location within said text and said executing said text and said at least one icon comprises executing said plurality of icons consecutively.

3. The method as claimed in claim 2, wherein said inserting a plurality of icons at a same location within said text comprises inserting at least one separator symbol between said plurality of icons.

4. The method as claimed in claim 1, wherein said inserting at least one icon comprises inserting a plurality of icons at a same location and said executing said text and said at least one icon comprises executing said plurality of icons simultaneously.

5. The method as claimed in claim 1, wherein said given feature of an appearance is one of a color of said at least one icon, a shape of said at least one icon, and a depiction of said at least one icon.

6. The method as claimed in claim 1, wherein said given feature is associated with said entity and an additional feature of said appearance of said at least one icon is associated with said part of said entity.

7. The method as claimed in claim 6, wherein said position of said at least one icon in said text is further dependent on said part of said entity.

8. The method as claimed in claim 1, wherein said inserting at least one icon comprises inserting a plurality of icons to be regrouped together to form a continuous sequence of icons and executed in sequence according to a set of predefined synchronization rules.

9. The method as claimed in claim 1, wherein said inserting at least one icon comprises dragging and dropping said icon directly into said text from an icon box.

10. The method as claimed in claim 1, wherein said inserting at least one icon comprises dragging and dropping said icon directly into said text from a world view.

11. The method as claimed in claim 1, wherein said inserting at least one icon comprises inputting a textual command that will generate said icon.

12. The method of claim 1 wherein the order of execution of an event within the text is language specific and depends on a direction in which the text is written/read.

13. The method as claimed in claim 1, wherein the non-textual content includes one or more of: video, audio, image, action, time markers, and spatial markers.

14. A system for creating an animation from text, comprising:
at least one processor in one of at least one computer and at least one server; and
at least one application coupled to the at least one processor, said at least one application being configured for:
receiving, from a text input, a text comprising one or more entities and one or more events, the events comprising one or more of: actions to be performed by an entity of by a part of the entity, and words to be transformed into speech;
receiving a user input inserting at least one icon and embedding the at least one icon at a given position in the text, said at least one icon for embedding a non-textual content into the text;
generating the animation for display on a display unit, the generating comprising executing the text and said at least one icon;
wherein executing the text comprises constructing a visual depiction of the text and performing one or more of: generating a visual depiction of the actions performed by the entity or by the part of the entity, and converting the words to a speech using a text-to-speech module; and
wherein executing the at least one icon includes executing the non-textual content of the icon wherein said execution occurs at a point in time corresponding to the given position of said at least one icon in said text, said point in time being equivalent to the time at which an order of execution reaches the icon in the text.

15. The system as claimed in claim 14, wherein said at least one processor is located in said at least one computer and said at least one application is located in said at least one computer.

16. The system as claimed in claim 14, wherein said at least one processor comprises a first processor located in said computer and a second processor located in said server, and said at least one application comprises a first application coupled to the first processor and a second application coupled to the second processor, said first processor configured for receiving said text, sending said text to said server, and receiving said animation, and said second processor configured for receiving said text from said computer, and executing said text and said at least one icon, and sending said animation to said computer.

17. The system as claimed in claim 14, wherein said at least one application is further configured for determining animation information using said text and said at least one icon, and generating said animation using said animation information.

18. The system as claimed in claim 17, wherein said at least one processor comprises a processor located in said at least one computer and said at least one application comprises an application coupled to said processor, said application configured for determining said animation information and generating said animation.

19. The system as claimed in claim 17, wherein said at least one processor comprises a first processor located in said at least one computer and a second processor located in said at least one server and said at least one application comprises a first application coupled to the first processor and a second application coupled to the second processor, said first processor configured for determining said animation information, sending said animation information to said server, and receiving said animation, and said second processor configured for receiving said animation information, generating said animation, and sending said animation to said first processor.

20. The system as claimed in claim 17, wherein said at least one processor comprises a first processor located in said at least one computer and a second processor located in said at least one server and said at least one application comprises a first application coupled to the first processor and a second application coupled to the second processor, said first processor configured for sending said text to said server and receiving said animation, and said second processor configured for receiving said text, determining said animation information, generating said animation, and sending said animation to said first processor.

21. The system of claim 14, wherein the order of execution of an event within the text is language specific and depends on a direction in which the text is written/read.

22. The system as claimed in claim 14, wherein the non-textual content includes one or more of: video, audio, image, action, time markers, and spatial markers.

23. A method for creating an animation using text, the method comprising:
receiving from a text input, a text comprising one or more entities, one or more events comprising one or more of: actions to be performed by an entity or by a part of the entity, and words to be transformed into speech, and at least one icon for embedding a non-textual content into the text;
generating the animation for display on a display unit, the generating comprising executing the text and said at least one icon;

wherein executing the text comprises constructing a visual depiction of the text and performing one or more of: generating a visual depiction of the actions performed by the entity or by the part of the entity, and converting the words into a speech using a text-to-speech module; and wherein executing said at least one icon includes executing the non-textual content of the icon wherein said execution occurs at a point in time corresponding to a position of said at least one icon in said text, said point in time being equivalent to the time at which an order of execution reaches the at least one icon in the text.

24. The method as claimed in claim 23, wherein the non-textual content includes one or more of: video, audio, image, action, time markers, and spatial markers.

\* \* \* \* \*